United States Patent [19]

Rolles et al.

[11] Patent Number: 4,956,140

[45] Date of Patent: Sep. 11, 1990

[54] METHODS OF AND APPARATUS FOR PRODUCING BIAXIALLY ORIENTED POLYMER PRODUCT

[75] Inventors: Rolf Rolles, New Kensington; Darral V. Humphries, Allentown, both of Pa.

[73] Assignee: Aluminum Company of America ALCOA Laboratories, Alcoa Center, Pa.

[21] Appl. No.: 268,405

[22] Filed: Nov. 8, 1988

Related U.S. Application Data

[63] Continuation-in-part of Ser. No. 933,951, Nov. 24, 1986, Pat. No. 4,874,657, Continuation-in-part of Ser. No. 806,994, Dec. 9, 1985, Pat. No. 4,789,514.

[51] Int. Cl.$^5$ .................... B29C 42/22; B29C 55/16; B29C 43/16; B29C 43/48
[52] U.S. Cl. .................... 264/280; 428/220; 264/175; 264/177.16; 264/177.17; 264/290.2; 264/323; 425/363; 425/364 R; 425/384; 425/394; 425/407; 425/411
[58] Field of Search ................ 26/51, 71, 72, 87, 99, 26/106; 264/175, 177.16, 177.17, 280, 290.2, 323; 425/363, 364 R, 384, 394, 407, 411

[56] References Cited

U.S. PATENT DOCUMENTS 3,147,164  9/1964  Adams ..................... 425/384 X
3,795,470  3/1974  De Mets .................. 425/335 X
3,904,336  9/1975  Axer et al. .............. 425/335 X
4,216,179  8/1980  Lamberts et al. ........ 425/335 X
4,792,426 12/1988  Greatorex et al. ....... 264/280 X

FOREIGN PATENT DOCUMENTS 2343930  3/1975  Fed. Rep. of Germany ...... 264/175
 611148  6/1926  France ........................... 264/175
2184834  8/1987  Japan ............................. 264/280
 302452  1/1955  Switzerland ................... 264/280

Primary Examiner—Werner H. Schroeder
Assistant Examiner—Bradley Kurtz DeSandro
Attorney, Agent, or Firm—Millen, White & Zelano

[57] ABSTRACT

In accordance with the instant invention, biaxially oriented polymer sheet is produced by continuously forging polymer feedstock between a pair of converging belts in an isochoric deformation region to form the sheet from the feedstock. The resulting sheet is immediately annealed after being formed and subsequently cooled after being annealed by passage through an isobaric region defined by a pair of opposed parallel belts backed by a pair of opposed parallel platens which interface with the belts via an oil seal so as to transfer heat from the sheet through the belts to the cooled platens. The resulting sheet has substantially uniform strain distribution over the width and length thereof as well as through the thickness thereof while maintaining its flatness after emerging from the apparatus.

16 Claims, 5 Drawing Sheets

METHODS OF AND APPARATUS FOR PRODUCING BIAXIALLY ORIENTED POLYMER PRODUCT

CROSS-REFERENCE TO RELATED APPLICATIONS

This application is a continuation-in-part application of U.S. patent application serial No. 933,951, filed Nov. 24, 1986, which is a continuation-in-part application of U.S. patent application Ser. No. 06/806,994, filed Dec. 9, 1985. This application is also related to PCT application No. PCT/US 88/01569, filed May 11, 1988.

BACKGROUND OF THE INVENTION

The instant invention relates to methods of producing biaxially oriented polymer product and to the product produced thereby. More particularly, the instant invention is directed to methods of producing such a product by continuous forging, wherein polymer feedstock is advanced between a pair of opposed belts.

Biaxially oriented polymers, such as the polypropylene polymers sold under the trademark BEXOR, have numerous advantages over unoriented polymers in that they have higher strength, improved stiffness, increased toughness and superior thermoformability. Biaxially oriented polymers have been successfully produced using the techniques disclosed in U.S. Pat. No. 4,282,277, the disclosure of which is incorporated herein by reference, assigned to the assignee of the instant invention, wherein a tubular product is initially produced by hydrostatic extrusion using a mandrel in combination with a conical die. The tubular product is then cut, flattened and annealed utilizing expensive flattening and annealing equipment. While the mandrel-conical die approach results in excellent biaxial orientation of structures, it is necessary to expend considerable effort to remove residual curvature in the resulting sheet. Even when the curvature has been removed by reconfiguring the extruded tube into a flat sheet, residual and unbalanced stresses and strains in the original tube tend to subsequently reassert themselves, resulting in difficulties when using the sheet.

In addition, the cost of the biaxially oriented sheet produced in accordance with the teachings of U.S. Pat. No. 4,282,277 is relatively high, since only a single billet may be extruded at a time and intermittent production results in high yield losses. In addition, it has proved expensive and difficult to keep the mandrel properly aligned within the die and to produce uniform sheet during the extrusion process.

In order to avoid the expense of first forming a tube and subsequently slitting and flattening the tube to form a biaxially oriented sheet, the inventors of the instant invention explored extruding polymers while in the solid state utilizing dies with protrusions therein as is set forth in U.S. patent application Ser. No. 806,994, filed Dec. 9, 1985. Utilizing protrusions within flat dies overcomes the non-uniformity which ordinarily occurs in flat dies due to friction between the workpiece and the die. While this approach results in a product which does not have to be slit and flattened before producing sheet, the process is an intermittent one, wherein the sheets are produced one at a time, as opposed to a continuous process. Moreover, utilization of a stationary die requires a very large machine, which can withstand required extrusion pressures on the order of 10,000 psi (703 kg/cm$^2$) or more. In actual experiments, pressures of 7,000 psi (492 kg/cm$^2$) were required for flat dies having protrusions whereas pressures of only 1200 psi (84.4 kg/cm$^2$) were required for twin-belt machines. Due to high extrusion pressures, flat die machines require an initial capital outlay much greater than twin-belt machines.

While biaxially oriented sheet can be produced by platen forging and cross-rolling, each of these processes has the drawback of being a batch process as opposed to a continuous process and therefore has serious size and economic limitations. Consequently, it is difficult to produce elongated sheets of material. In addition, with a sheet forged between parallel platens, the sheet must be produced from a circular blank in order to have uniform biaxial orientation. The blank must then be trimmed which adds an additional step and wastes material. While sheets produced by crossrolling have a roughly rectangular shape, they exhibit wavy surfaces resulting from non-uniform elastic springback of sheet emerging from the roll nip and consequently are not necessarily suitable for subsequent shaping and forming. Moreover, due to short deformation times in cross rolling, the resulting elastic springback leads to a reduction of desirable properties such as stiffness.

Pursuing the opposed-belt concept, the inventors of the instant invention investigated utilizing a twin belt annealing press of the type generally used in the manufacture of items such as particle board, wherein wood particles or fibers are pressed together in the presence of a bonding agent to create sheets of material. This type of process is practiced at lower pressures than those required to biaxially orient polymers and was proved by tests to be unsatisfactory. The inventors also explored twin-belt machines used for producing metal sheet or slab by continuous casting. However, continuous casting machines only require sufficient pressure to retain the melt being processed thereby. In these types of machines, molten material is deposited between a pair of converging belts and spreads laterally and longitudinally between the belts in order to continuously produce a metallic sheet product. In view of the inadequacy of these approaches, there appears to be little promise in utilizing existing opposed belt approaches for biaxially orienting feedstock to produce biaxially oriented polymer sheet.

As is set forth in parent applications, 933,951 and 806,994, biaxial orientation of thermoplastic sheet in continuous twin belt presses requires at least three major steps. The first is the transport of thick plastic slabs by belts through an angled deformation zone where the plastic slabs are squeezed so that the material therein flows both parallel and perpendicular to the extent of the belts thereby forming biaxially oriented sheet. Secondly, the biaxially oriented sheet is passed through a zone where the belts are parallel and wherein the molecular structure of the material of the sheet is heat set or annealed. Finally, the sheet which has been annealed is transported through a cooling zone in order to reduce the temperature of the sheet to a level below its heat deflection temperature so that the sheet remains flat.

The first step in which the narrow slab is converted to a wide sheet causes the surface area of the plastic to increase. This requires an isochoric or roll supported belt system which allows the belts and product to move through the press. Isochoric presses for biaxially orientation of plastic sheets have several disadvantages. First of all, belts have limited life due to bending and cracking at the points where the rolls support the belts in the high pressure deformation zone. Moreover, heat transfer from the hot plastic sheet to the machine cooling zone is poor, since heat flows from the belts through individual roll contact points or lines to the cold stationary press platens. In that heat transfer controls production rates of biaxially oriented sheet in twin belt presses, very long machines (and belts) must be used for the production as to be economical. Consequently, machines and belts can become very expensive. In addition, if a special finish such as a glossy or textured finish is required on the biaxially oriented plastic sheet, the finish must be applied to the working surfaces of both belts which can add enormous additional expense to the cost of the belts.

In view of these considerations, and other considerations, there is a need for improvement in isochoric processes and other processes accompanying the isochoric processes and there is a need for apparatus to accomplish these improvements and processes.

SUMMARY OF THE INVENTION

In view of the aforementioned difficulties encountered in producing biaxially oriented product by continuous processes, the instant invention has, among other objects, the following objects: first, to minimize belt costs; second, to lessen power requirements; third, to maximize heat transfer during annealing and stabilization of the sheet; fourth, to provide additional manufacturing flexibility by allowing the production of special sheet finishes without changing belts; and fifth, to enhance the ability to produce metal/polymer and polymer/polymer composite sheets in situ.

In view of the aforementioned objects and other objects, the instant invention contemplates a method of and apparatus for producing biaxially oriented polymer product such as polymer sheet by introducing a solid work piece of polymer feedstock in an axial direction between a first pair of moving opposed endless surfaces which converge in a downstream direction to form an isochoric working region where high pressure and high temperature deformation of the work piece occur. Preferably, there is an annealing zone incorporated in the isochoric region just downstream of the deformation zone for annealing the sheet produced in the deformation zone. The isochoric region is immediately followed by an isobaric region in which a second pair of moving opposed endless surfaces are arranged in parallel. In the isobaric region, the moving opposed endless surfaces are supported on an oil film so as to provide enhanced heat transfer.

Preferably, there is a sufficient gap between the isochoric and isobaric regions to enable surface finishing materials to be inserted between the biaxially oriented sheet squeezed from the work piece and the parallel endless surfaces for bonding in situ or for embossing special surfaces on the final sheet. The inserted material may be films of metal or plastic or may be fabrics of various sorts and of various materials.

In accordance with a preferred embodiment of the invention, the first and second endless surfaces are stainless steel belts which are supported by opposed arrays of rollers in the isochoric section and by opposed platens in the isobaric section. The opposed platens in the isobaric section interface with the stainless steel belts through a peripheral, dynamic platen seal in which oil films both support and lubricate the belts, while allowing rapid heat transfer through the belts to the platens which serve as heat sinks. The platens are cooled by conventional means such as circulating cool water or a refrigerant therethrough.

The isochoric stage preferably includes an annealing substage in which the belts run parallel for a short distance. The annealing substage is located just downstream from the converging portion of the isochoric stage and in the annealing substage, the belts are supported by opposed arrays of rollers.

In the isochoric working region, the belts converge toward one another at an angle in an approximate range greater than zero degrees and less than six degrees. The angle utilized depends on numerous factors such as polymer composition, surface friction, workpiece width and thickness and workpiece temperature. In the isochoric working region, the feedstock is simultaneously elongated in a longitudinal direction while being spread in a lateral direction as it is reduced in thickness. By such a process, the material is advanced between the surfaces due to frictional engagement of the surfaces with the workpiece and emerges at the end of the deformation zone as biaxially oriented sheet at the same speed as the belts. While it is being processed, the temperature of the workpiece is maintained between its glass transition temperature and its viscous flow temperature during deformation and the surfaces are maintained under conditions which equalize the surface friction effects and the internal resistance to compressive flow of the polymer. Immediately after the workpiece has been reduced in thickness, it is restrained for a period of time between parallel portions of the belts at a temperature sufficient to stabilize the morphology thereof through crystallization or crosslinking so that the product remains stable subsequent to the biaxial-orientation production.

Preferably, the polymers being processed by the apparatus are selected from a semi-crystalline group of materials including polypropylene, polyethylene, ultra-high molecular weight polyethylene, polyacetal, polyamide, polyethylene terephthalate and polybutylene terephthalate. The polymer could also be selected from an amorphous group of materials including polyvinyl chloride, polystyrene, polymethylmethacrylate, polycarbonate and polyethylene terephthalate. The aforementioned polymers can also be biaxially oriented with up to 60% by weight of fillers such as calcium carbonate, talc, mica, or alumina trihydrate. Fillers which render sheets fire proof or fire retardant, e.g., those comprising aluminum trihydrate, can be used to form structural panels, e.g., for aircraft interiors, which heretofore was not possible because sheets formed from such filled polymers lacked sufficient flexural and impact strength to be utilizable for such purposes.

Apparatus for practicing the methods of the instant invention include continuous forging machines in the form of a twin-belt presses having pairs of temperature controlled, opposed belts which converge to biaxially orient polymers in an isochoric region. The isochoric region includes opposed arrays of rollers for supporting the belts and maintaining the correct inter-belt spacing. If necessary, an annealing zone in which the belts run parallel is positioned in the isochoric region just downstream of the region in which belts convergence. In the isochoric region, the rollers are supported by heated platens. An isobaric region in which the belts are parallel and are supported on cooling platens by a dynamic oil seal is positioned downstream of the isochoric region. In the isobaric region, the sheet is stabilized while being restrained between the belts.

The novel polymer sheet produced by the aforedescribed method and apparatus has planar surfaces, is semi-crystalline or amorphous and has a density equal to or higher than that of the unoriented polymer form which it is produced. The sheet has a uniform distribution of deformed crystalline aggregates in a matrix of deformed amorphous molecules, or has deformed amorphous molecules only, through the thickness thereof with substantially uniform strain distributed throughout the sheet.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DESCRIPTION OF PREFERRED EMBODIMENT

Figure 1:
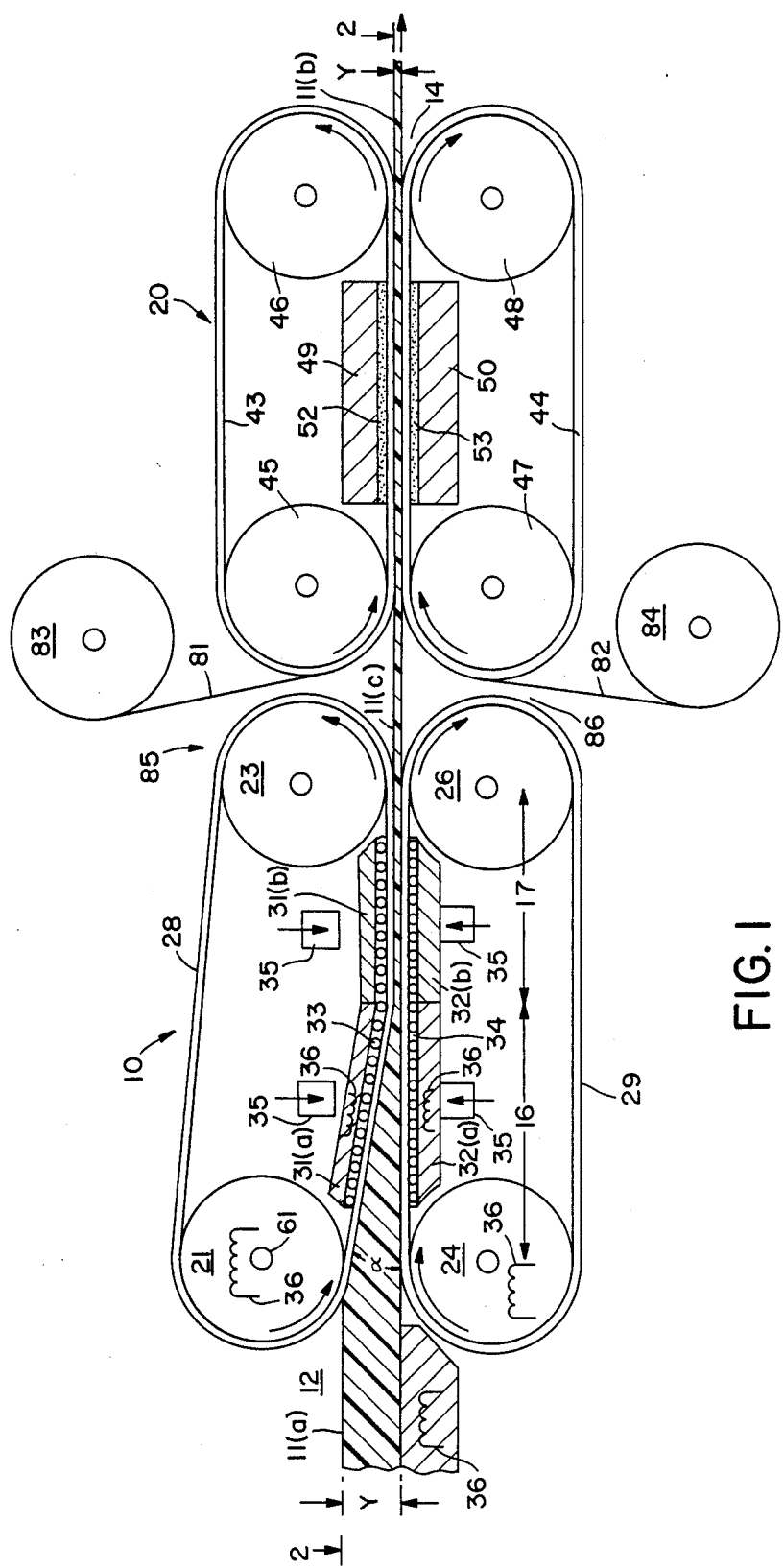
FIG. 1 is a side view of apparatus for practicing the method of the instant invention, the apparatus having isochoric and isobaric regions and being used to produce biaxially oriented sheet having a new and improved structure.
Figure 2:
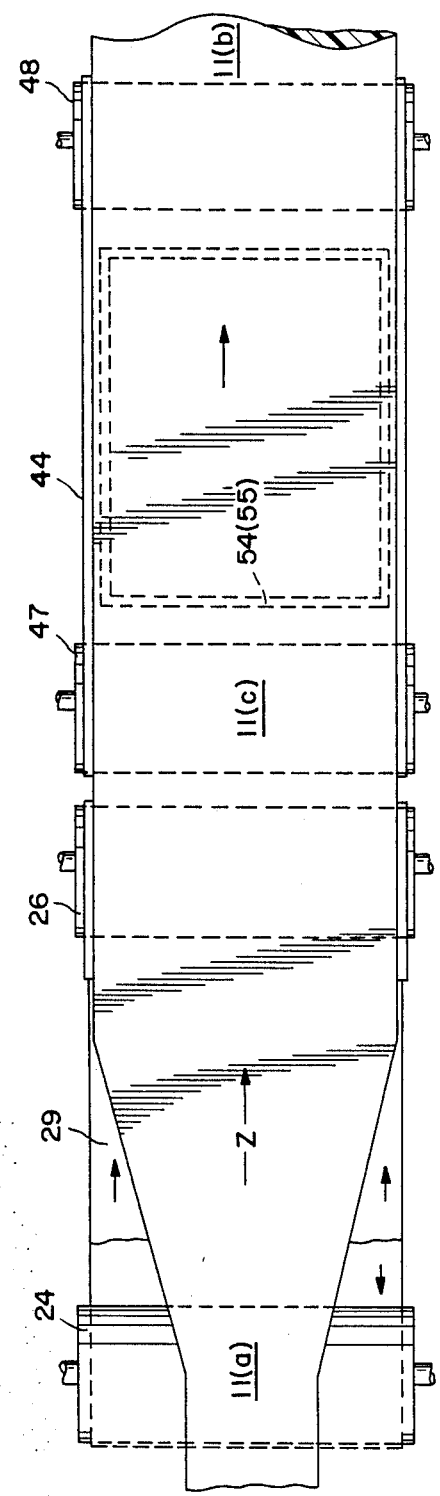
FIG. 2 is a top view of the apparatus of FIG. 1, taken generally along line 2—2 of FIG. 1.

Referring now to FIGS. 1 and 2, there is shown a twin-belt processing apparatus, designated generally by the numeral 10, in which polymer feedstock 11(a) is formed into biaxially oriented, stabilized sheet 11(b). The twin belt processing apparatus 10 receives the polymer feedstock 11(a) at its upstream end 12 and dispenses biaxially oriented sheet 11(b) at its downstream end 14. The twin-belt press 10 has an isochoric working region 16 which biaxially orients and includes the feedstock 11(a) and an annealing region 17 which restrains the biaxially oriented feedstock as the feedstock is annealed. Just downstream of the annealing region 17 is a separate isobaric region designated by the numeral 20 in which the oriented and annealed sheet 11(c) is cooled.

Ideally, the workpiece 11(a) is produced just upstream of the twin-belt machine 10 of FIG. 1 by feeding pellets (not shown) of the workpiece material into an extruder (not shown), extruding the workpiece, cooling the workpiece (not shown) and feeding the workpiece directly into the twin-belt machine 10 as a continuous body. Alternatively, the workpiece 11(a) can be made continuous by heat welding billets produced elsewhere end-to-end (not shown) just prior to feeding the workpiece into the twin-belt machine 10.

The isochoric and annealing regions 16 and 17, respectively of the twin-belt press 10 includes two upper rollers 21 and 23 and two lower rollers 24 and 26 opposing the upper rollers. Trained around the upper rollers 21 and 23 is a metal belt 28, while trained around the lower rollers 24 and 26 is a belt 29. The belts 28 and 29 are preferably made of chrome plated steel, are seamless, and have a hardness of at least 45 Rockwell C. As is seen in FIG. 1, the portions of the belts 28 and 29 between the rollers 21 and 24 in the working region 16 are urged into substantially uniform engagement with the feedstock 11 by a pair of opposed, upper and lower heated platens 31 and 32, respectively. The platens 31 and 32 engage the inside surfaces of the respective belts 28 and 29 with arrays of closely spaced rollers 33 and 34, respectively. The closely spaced rollers 33 and 34 provide relatively closely spaced contact lines on the belts 28 and 29 which substantially eliminates rebound of the material deformed in the isochoric deformation region 16. The entry angle between the belts 28 and 29 in the isochoric region 16 is in the approximate range of greater than zero degrees and less than six degrees.

The optimum angle $\alpha$ for producing balanced biaxial orientation is a function of the thickness of the polymer feedstock 11, the width thereof, the polymer composition, and the desired orientation ratio. For polypropylene feedstock 0.5 inches (12.7 mm) thick and 6 inches (15.2 cm) wide the angle $\alpha$ for a balanced biaxial orientation ratio of 2.2–2.5 is typically in the range of 2.48 degrees to 3.14 degrees. The specific angles for particular materials are derived by an experimental program designed to define the effects of temperature, surface friction, polymer composition and orientation ratio desired.

By conventional means, the rollers 21, 23, 24 and 26 and the platens 31(a) and 32(a) are heated to a temperature between the glass transition temperature of the polymer and temperature of viscous flow of the feedstock 11. Preferably, the feedstock 11 is also heated to a temperature above the glass transition temperature, but below the temperature of viscous flow prior to passing the feedstock through the first region 16. Generally, if the feedstock 11 being biaxially oriented is polypropylene, it will be heated by conventional heaters 36 to approximately 140°–160° C., as will the platens 31(a) and 32(a) and the rollers 21 and 24. The temperature rise upon working the feedstock 11(a) does exceed the melting temperature of polypropylene.

Control of the relative temperatures of the surfaces and the feedstock within the overall temperature range as defined above, is an essential parameter in equalizing the surface friction and flow resistance of the polymer, thereby achieving substantially uniform through-the-thickness, biaxial orientation. For example, in the case of polypropylene, it has been shown that substantially uniform, biaxial orientation is achieved when the surfaces are heated to about 160° C. and the workpiece to about 146° C.

With the twin-belt machine 10 there is a constant belt velocity from the inlet end 12 of the machine to the outlet end 14. Accordingly, the twin-belt machine 10 diminishes longitudinal sliding friction in the isochoric region 16 which is not caused by deformation of the work piece 11(a). Longitudinal sliding friction occurs with both the flat or conical die approach of the prior art when feedstock is pushed through the dies. Any frictional forces which do occur between the belts 28 and 29 and feedstock 11(a) are created by spreading of the feedstock polymer. These forces are substantially less than the sliding frictional forces which occur when solid-state extruding the feedstock 11(a) by urging it through a stationary die.

Figure 3:
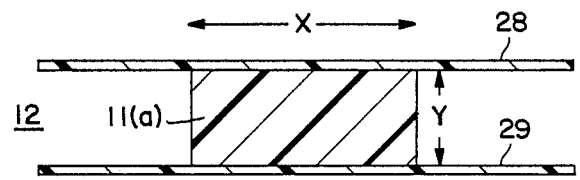
FIG. 3 is a cross-section of FIG. 1, showing dimensions with exaggerated thickness of feedstock entering the apparatus of FIG. 1.
Figure 4:
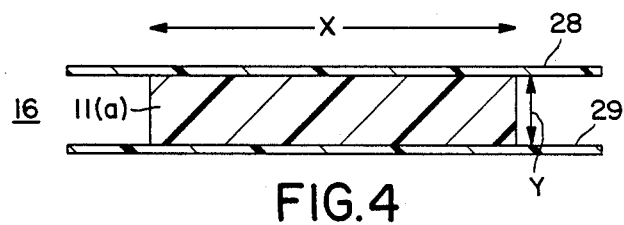
FIG. 4 is a cross-section of FIG. 1, showing the feedstock of FIG. 3 with exaggerated thickness being biaxially oriented by the apparatus of FIG. 1.

Referring now to FIGS. 3–7 in conjunction with FIGS. 1 and 2, the relative dimensions of the feedstock 11 are shown as the feedstock is worked to produce the sheet 11(b). As is seen in FIG. 3, the feedstock 11(a) enters between the nip of rollers 21 and 24 having a relatively thick vertical dimension Y and relatively narrow width X.

As the feedstock 11(a) advances through the isochoric working region 16 (FIG. 4), the Y dimension decreases and the lateral X dimension increases, as does in the Z direction backflow against the belt surfaces (see FIG. 2). When the feedstock 11(a) reaches the end of the isochoric working region 16, it has spread in the X direction to a degree sufficient to extend substantially completely across the belts 28 and 29.

Figure 5:
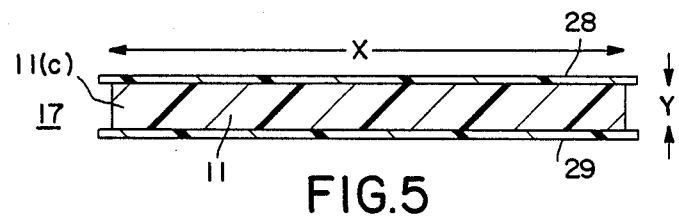
FIG. 5 is a cross-section of FIG. 1, showing feedstock with exaggerated thickness after it has been biaxially oriented.
Figure 6:
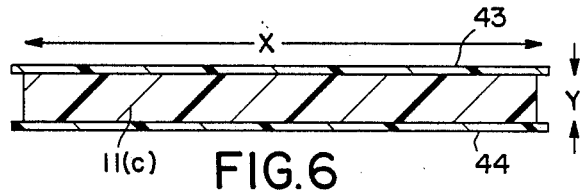
FIG. 6 is a cross-section of FIG. 1, showing the sheet with exaggerated thickness being restrained as it is cooled and/or annealed while being advanced.
Figure 7:
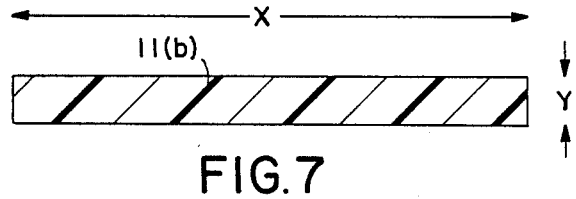
FIG. 7 is a cross-section of the sheet as it emerges from the apparatus of FIG. 1.

As is seen in FIGS. 5 and 6, the feedstock 11(a) retains its dimensions as it advances through the annealing region 17. The annealing region 17 includes two pairs of opposed platens 31(b) and 32(b) for heat treating the workpiece 11(a) after it has been spread laterally and reduced in vertical cross-section in the isochoric working region 16. As is seen in FIG. 7, the feedstock 11(a) emerges from the downstream end of the annealing region 17 as a biaxially oriented and annealed sheet 11(c). The platens 31(a) and 32(a), as well as the platens 31(b) and 32(b) are held in position by conventional hydraulic jacks 35.

Biaxally oriented polymers cool relatively slowly in twin-belt machines thus limiting production rates. Machines with very long cooling zones are undesirable from both a mechanical and a cost viewpoint, so in accordance with the instant invention, the isobaric cooling machine 20 is provided. In the isobaric machine 20, the sheet 11(c) is retrained between belts 43 and 44 trained around roller pairs 45–46 and 47–48, respectively, while being cooled directly after emerging from the annealing region 17 of isochoric twin-belt machine. In accordance with a preferred embodiment of the invention, the belts 43 and 44 are urged into engagement with the sheet 11(c) by opposed platens 49 and 50 which may be cooled by conventional means such as circulated refrigerant or cold water. The platens 49 and 50 isobarically support belts 43 and 44 on oil films 52 and 53 contained by dynamic peripheral seals 54 and 55 (FIG. 2). The oil films provide excellent conductive heat transfer from the platens 49 and 50 to the belts 43 and 44 so that heat is conducted through the belts and away from the sheet 11(c).

If necessary or desired strips of surface sheets such as metallic foil, plastic films or other sheet products or devices 81 and 82 may be inserted between the sheet 11(c) and either one of or both of the belts 43 and 44.

The strips 81 and 82 are preferably unwound from reels 83 and 84, respectively, and are fed through gaps 85 and 86 between the isochoric processing region and isobaric processing region so as to be applied to the sheet 11(c) in the isobaric region.

Figure 8:
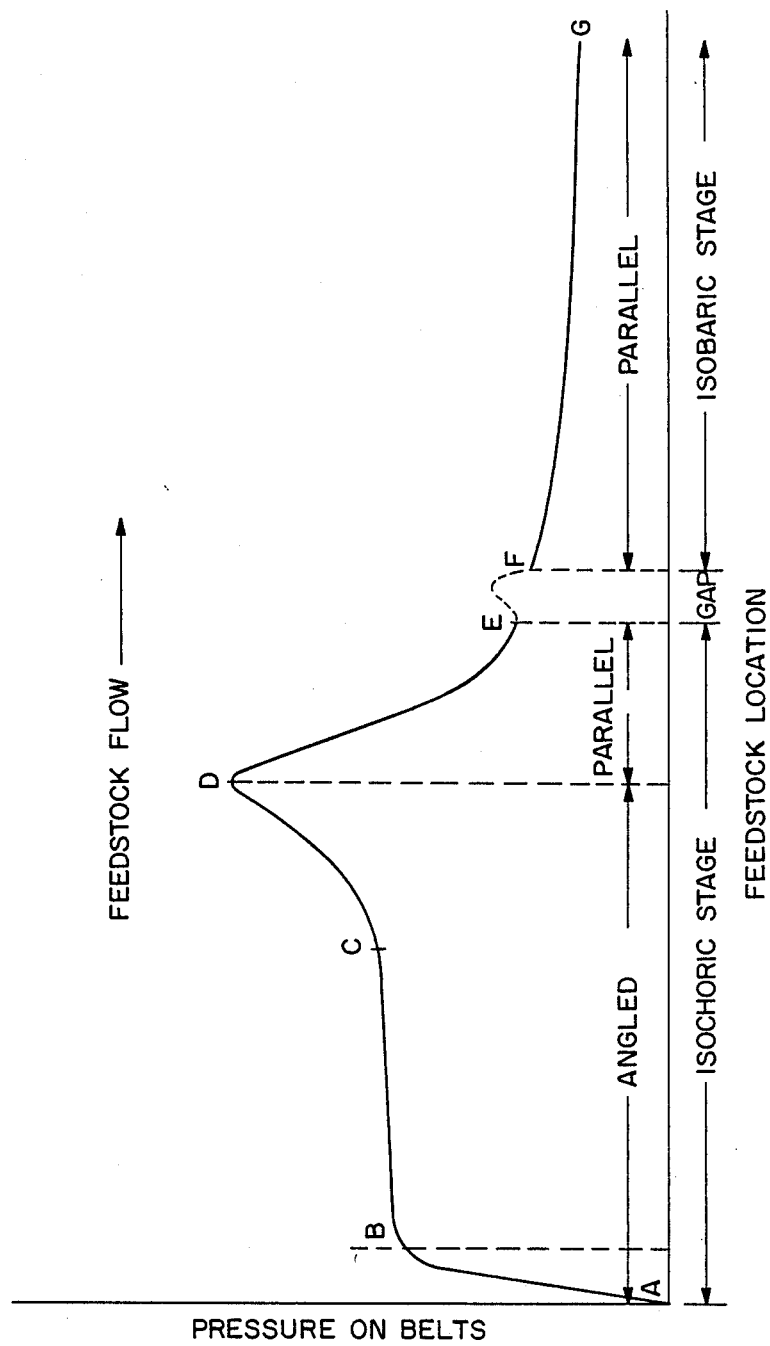
FIG. 8 is a diagram illustrating the pressure profile on the belts as a function of feedstock location.

The advantages of the combined isochoric/isobaric machine 10–20 can be easily understood by reference to FIG. 8. At point A, polymer feedstock 11(a) is engaged by belts 28 and 29 in the angled isochoric zone 16 and is elastically compressed by the belts to point B. At point B, the pressure exerted by the belts 28 and 29 exceeds the compressive flow stress of the polymer and the polymer begins to spread on the belts. Between points B and C, polymer is spreading at a relatively constant pressure, but the area of the polymer is increasing so that the total load on the belts 28 and 29 increases in this region. At point C, the location of which depends on the polymer being processed, molecular changes in the structure of the polymer can only be accomplished by additional pressure. The polymer resists these changes by strain hardening. Therefore, from point C to point D, greatly increased pressure is needed to overcome the strain hardening of the polymer to produce a molecular structure with the enhanced properties needed for commercial usefulness.

Since the area of the polymer sheet being formed from the feedstock 11(a) is still increasing from point C to point D, the belts 28 and 29 must be isochorically supported. At point D, the polymer feedstock 11(a) has been deformed to the orientation ratio desired and enters the parallel isochoric zone 17 where the residual stresses rapidly decay so that, at point E, where the polymer sheet 11(c) emerges from the parallel isochoric zone, the residual stress in the polymer sheet is substantially lower than at point D. The actual level of residual stress at point E depends upon the polymer composition, processing temperature and length of the parallel isochoric zone.

At point E, the polymer sheet 11(c) leaves the isochoric portion of the machine and moves through a gap 86 to point F where it enters the isobaric section 20. In the gap E–F a small amount of elastic recovery of the polymer sheet takes place, but this can usually be neglected. At point F, cooling of the sheet 11(c) takes place and in the isobaric section F–G, pressures are considerably lower than in the isochoric section A–E. Typically pressures in the isobaric section will be ten to thirty percent of the pressures in the isochoric section. At point G, the cooled, stable sheet 11 (b) emerges from the machine 20 and is ready for subsequent use.

The highest pressures and loads in the machine 10 are developed in the region C–D. To resist these forces, the most effective method which can be employed is to increase the thickness and hardness of the belts 28 and 29. In order to accomplish this, two or more overlapping belts may be utilized. Therefore, it is desirable to keep the belt length in the isochoric section 10 to a minimum.

The isobaric section F–G can operate with relatively thin belts 43 and 44 which will have a relatively long life and which can be economically polished or otherwise treated to transfer a special finish to the polymer sheet 11(b) as it cools.

The flat sheets 11(b) produced by the processes and apparatus illustrated in FIGS. 1–8 are substantially biaxally oriented, semi-crystalline or amorphous, thermoplastic, polymer sheets which, unlike those of U.S. Pat.

No. 4,282,277, have substantially uniform strain throughout the thicknesses thereof.

The final product as exemplified by sheet 11(b), if made from a semi-crystalline polymer, is characterized by having a microstructure comprised of spherulitic crystalline aggregates which are compressed transversely to the plane of the product and are biaxially oriented in the plane of the product. The product is substantially devoid of any process induced microvoids and microfibrils. The product retains at least the same density as the unoriented polymer and is less permeable than a product made by conventional solid state stretching processes.

The thermoplastic sheet 11(b) may contain up to about 60% by weight of filler material. Prior to the advent of hydrostatically extruded BEXOR, it was very difficult, if not impossible, to produce on a commercial scale oriented thermoplastic material which contains a substantial quantity of filler material. When a semi-crystalline thermoplastic polymer contains a filler and is worked in accordance with the present invention, the thermoplastic polymer can be successfully oriented as described above and will have a structure unlike previous products, in that it is substantially devoid of microvoids and microfibrils and having within the thermoplastic polymer discrete, platelike, spherulitic, crystalline aggregates which are compressed transversely to the plane of the product and biaxially oriented in the plane of the sheet 11(b).

The sheet product 11(b) can be used as is for structural or like purposes, or other uses, but will in many cases be used as a blank to form final products such as, for example, solid state formed products. Many solid state formed products are so called stretch-formed products where the thermoplastic polymer is formed in a die under sufficient heat and pressure to deform the thermoplastic polymer in a solid state. The properties of the final solid state stretch-formed product will depend primarily upon the extent of deformation. However, the solid state stretch-formed products made from the biaxially oriented sheet blanks of the invention have superior properties compared with the properties of similar products made from unoriented thermoplastic polymer. For example, stretch-formed products made from the biaxially oriented thermoplastic polymer sheet blanks of the invention will have a more uniform cross section since the superior properties of the oriented thermoplastic polymer prevent the thermoplastic polymer from "necking" down appreciably. The resulting product is thus more uniformly stiff than would otherwise be the case. The actual properties of the stretch-formed product may vary from place to place in the product depending upon the amount of work or deformation applied to any given portion of the product. Any flanges on the product, being substantially unworked, will have the same superior characteristic properties as the original biaxially oriented blank. In some products this is very important as the flanges provide important structural strength and toughness. The lips or flanges around the edges of refrigerator freezer door liners, freezer food containers, pans or tote boxes are representative of this type of product. Likewise, any portion of the product which is expanded by stretching will have enhanced property characteristics over the original oriented blank material, Therefore, products made from the biaxially oriented blanks of the invention will usually have very significant portions which have superior properties compared to products made from an unoriented thermoplastic polymer, filled or unfilled, of the same composition.

By way of example only and as is set forth in U.S. Pat. No. 4,282,277, a typical structure of a polymer, which in this instance is isotactic polypropylene used as the starting polymer forming feedstock 11(a), is shown pictorially in FIG. 9. The structure of the biaxially oriented sheet 11(b) is shown pictorially in FIG. 10.

Figure 9:
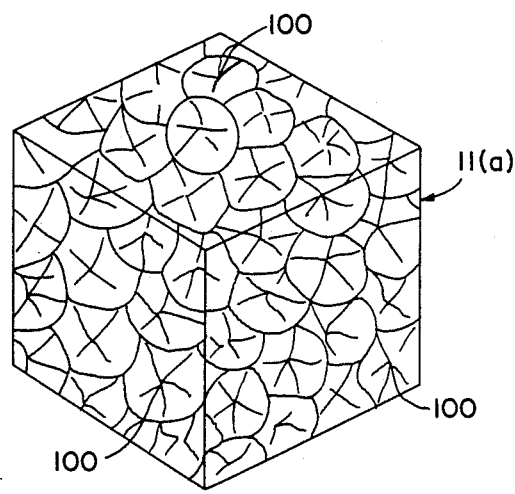
FIG. 9 is a perspective view of a square coupon of semi-crystalline, unoriented polymer prior to biaxial-orientation thereof.
Figure 10:
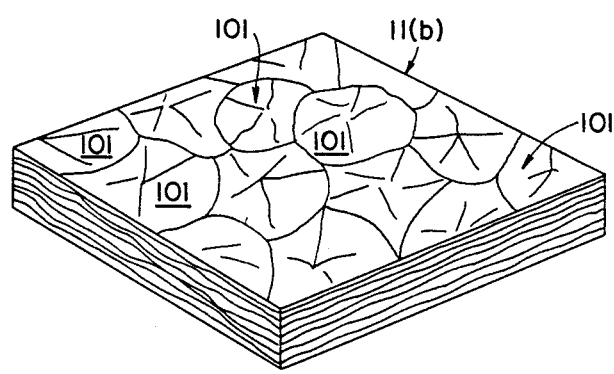
FIG. 10 is a perspective view of the coupon of FIG. 9, after biaxial-orientation, showing the conversion of spherulites into flat, platelike structures.

In the unoriented feedstock 11(a) of FIG. 9, it is seen that crystal growth started from nuclei 100 and folded chain crystals 101 grew radially until meeting adjacent crystals forming an array of rosettelike patterns shown in FIG. 10. In the biaxially oriented sheet 11(b) of FIG. 10, the crystals 101 are flattened, overlapped and interlocked forming a laminar structure.

If the polymer feedstock is polypropylene, it might, for example, have an initial thickness of 0.5 inches (12.7 mm) with the biaxially oriented sheet 11(b) 13 having a thickness of approximately one-tenth of an inch (2.54 mm).

The polypropylene utilized has approximately 65-70% crystallinity. Density measurements indicate that there are little or no changes in crystallinity from the feedstock 11(a) to the sheet 11(b), the only change being in morphology.

With respect to amorphous polymers such as PMMA, PVC and polycarbonate, biaxial orientation improves impact strength by absorbing impact energy through delamination in contrast to energy absorbed by puncture or through cracking as is the case with unoriented polymers.

Initial markets for products produced by the apparatus and method of the instant invention are ballistic shields, formed articles requiring superior physical and mechanical properties, and punched strips to produce terminal boards for the electronics industry.

In essence, the invention in its preferred embodiment is directed to a process for the continuous production of rectangular, relatively rigid, thermoplastic sheets 11(b) having substantially uniform thickness in the range of 0.03 inches (0.76 mm) to 0.5 inches (2.7 mm) and a thickness-to-width ratio less than about 0.04. The sheets consist of a compressively, biaxially oriented structure with essentially the same orientation ratio in all planes of the sheets. The sheets 11(b) have the combined properties of high strength, stiffness, low temperature impact and uniform thermal expansion. In essence, the sheets 11(b) are made by solid-state, continuous wedge forming of rectangular slabstock 11(a) between two flat converging belts 28 and 29 in an isochoric region 16 followed by substantially immediate annealing in the isochoric region 17 between a parallel run of the belts 28, 29 to stabilize the product structure at the biaxial orientation ratio desired. While in the isochoric region 16, the slabstock, which may contain up to 60% by weight of filler simultaneously spreads in both the transverse and longitudinal directions while between the belts 28 and 29 to produce a biaxially oriented sheet 11(c) with an elongation in both directions of at least 100%. The biaxially oriented sheet 11(c) is then stabilized while being restrained in the isobaric cooling region 20 to produce the sheet 11(b).

The process is capable of producing a continuous sheet of indeterminant length. However, the sheets may be discontinuous with the length of each sheet 11(b) being more than 20 feet (6.1 m) in order to provide discrete sheets which can be conveniently handled and if necessary cut into shorter lengths for whatever purposes desired. The apparatus 10 continues to operate and maintain its temperature and pressure parameters in the intervals between insertion of billets in the production of discrete sheets 11(b).

The sheets 11(b) produced by the process of this invention ordinarily are rectangular in cross-section and in the plane of the sheet are formed of a semicrystalline thermoplastic polymer which is biaxially oriented. The sheets 11(b) have a density which is equal to, or greater than, the density of the unoriented polymer and have a microstructure substantially devoid of process-induced microvoids and microfibrils. As is seen in FIG. 9, each of the sheets 11(b) are comprised of compressed, platelike, crystalline aggregates 101, which are biaxially oriented in the plane of sheet extent with the sheets having a substantially uniform distribution of deformed crystalline aggregates over the length and width thereof and through the thickness thereof.

The sheets of this invention are preferably produced as continuous, rectangular, polymer sheets of substantially uniform thickness with each of the sheets being comprised of a biaxially oriented, semicrystalline, thermoplastic polymer having a density which is at least equal to the density of the polymer in the unoriented state. Each sheet has a microstructure substantially devoid of process-induced microvoids and microfibrils, and being further comprised of discrete, platelike, crystalline aggregates formed from compressed, originally spherulitic aggregates; which aggregates are biaxially oriented in the plane of the sheet extent. Each sheet has substantially uniformly deformed crystalline aggregates over the length and width thereof and through the thickness thereof, resulting in a sheet which is thermally stable with substantially constant mechanical and physical properties in all planes.

Each sheet preferably has a thickness from about 0.03 inches (0076 mm) to about 0.5 inches (12.7 mm) e.g., 0.05 inches (1.27 mm) to 0.3 inches (7.62 mm) preferably, with a thickness-to-width ratio less than about 0.04, e.g., 0.001 to 0.01, preferably. The sheets are produced in lengths of at least 20 feet (6.1 m), optionally, but preferably for some end uses.

The sheet may contain filler material included therein which comprises up to 60% by weight of the sheet.

In one aspect of the invention, rectangular, biaxially oriented sheet is continuously produced from a thermoplastic amorphous polymer, the sheet having a density which is at least equal to the density of the unoriented amorphous thermoplastic polymer. This amorphous sheet has a substantially uniform distribution of strain over the length and width thereof, and through the thickness thereof, and has substantially constant mechanical and physical properties in all planes.

Orientation ratios in the range of 1.5 to 4.0 are generally considered most desirable for materials such as, for example, polypropylene. To achieve these orientation ratios, it is necessary to utilize machinery capable of maintaining pressures on the order of 1000 psi (70.3 kg/cm$^2$) in the isochoric region 16. Such machines as the twin-belt machines marketed by Kurt Held and Edward Kusters of the German Federal Republic can maintain such pressures; however, these machines require modification to incorporate a high pressure, fixed angle entry zone. Materials such as polyethylene, ultra high molecular weight polyethylene, polypropylene, and amorphous polyvinyl chloride have been successfully biaxially oriented to orientation ratios above 2.0 at pressures between 650 psi (45.7 kg/cm$^2$) and 1000 psi (70.3 kg/cm$^2$). At these pressures, materials such as polymethylmethacrylate which is an amorphous material, and polyacetal homopolymer which is a semi-crystalline material, have also been biaxially oriented.

Theoretically, the aforedescribed process and apparatus can produce flat sheet of any width. A sheet having a width of forty-eight inches can accommodate a host of existing situations for transport, storage, structures, and processing machinery. A forty-eight inch sheet may be conveniently produced from a billet or blank which is eighteen inches wide and half an inch thick. Sheet width is limited only by mechanical limitations in the belt equipment.

With the twin-belt arrangement, friction between the opposed belts and workpiece in the isochoric region 10 has only a spreading component since the work piece is carried longitudinally at the same speed as the twin belts. Reduction of this spreading or lateral friction component can be accomplished by a number of approaches. Inserting low friction polymer films made of a material such as TEFLON or polypropylene between the belts and workpiece can be accomplished by simply feeding the films between the belts and workpiece from rolls positioned at the entrance of the twin belt machine. Lubricants may be dispersed on the surfaces of the belts and/or on the workpiece or lubricating additives may be added to the polymer itself.

The process described has been mathematically modeled by proposing a constitutive equation to describe polymer deformation behavior and incorporating lateral flow finite element analysis. It is found that the biaxial orientation ratio (B.O.R.) of the polymer in the deformation zone of a twin belt machine can be expressed as a function of the following parameters:

$$B.O.R. = g(W_o, \lambda_t, \alpha, \mu, V_b, T)$$

where
$W_o$ = Width of slabstock feed;
$\lambda_t$ = Thickness reduction after deformation;
$\alpha$ = Width angle in the deformation zone;
$\mu$ = Coefficient of belt to polymer friction;
$V_b$ = Belt speed; and
T = Belt and polymer temperature From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of producing biaxially oriented polymer product from solid polymer feedstock material comprising the steps of:

biaxially orienting said polymer feedstock material by introducing the feedstock material between moving opposed isochorically supported belts which converge in a downstream direction, thereby simultaneously elongating the material in a longitudinal direction and spreading the material in a lateral direction while reducing the thickness of the material as the material advances with the converging opposed belts as the belts move in the longitudinal direction;

annealing the material after the material has been reduced in thickness and has assumed its final configuration; and restraining the material in an isobaric cooling region separate from the isochoric region, also by advancing the material between opposed parallel belts while withdrawing head from the material.

2. The method of claim 1, wherein rebound of the material is reduced by controlling the contour of at least one of the belts with an array of closely spaced rollers disposed between the belt and a platen in the isochoric processing region.

3. The method of claim 2, wherein heat transfer is maximized in the isobaric region by supporting the belts between opposed platens which interface with the belts through an oil film seal.

4. The method of claim 1, wherein heat transfer is maximized in the isobaric region by supporting the belts between opposed platens which interface with the belts through an oil film seal.

5. The method of claim 1, wherein the platens in the isochoric section are heated to maintain the temperature level of the material in the feedstock both while it is being reduced and after it is reduced to a level which is between the glass transition temperature of the polymer comprising the feedstock and the viscous flow temperature of an amorphous polymer or the melting temperature of a crystalline polymer.

6. The method of claim 5, further including the step of inserting at least one strip of surface sheet between one of the belts and the material just downstream of the annealing region and upstream of the isobaric cooling region.

7. The method of claim 6, further including the step of inserting another strip of surface sheet between the other belt and the material just downstream of the annealing region and upstream of the isobaric cooling region.

8. The method of claim 1, wherein the belts converged toward one another at an angle in the approximate range of greater than 0° and less than 6°.

9. The method of claim 1, wherein the polymer is selected from the group consisting of polypropylene, polyethylene, ultra high molecular weight polyethylene, polyacetal, polyamide, polyethylene terephthalate and polybutylene terephthalate.

10. The method of claim 1, wherein the polymer is an amorphous material.

11. The method of claim 10, wherein the amorphous material is selected from the group consisting of polyvinylchloride, polymethylmethacrylate, polycarbonate and polyethylene terephthalate.

12. The method of claim 1, where each belt of the pair of belts is trained around a pair of rollers of relatively large mass which rollers are temperature controlled so as to assist in controlling the temperature of the feedstock and resulting sheet.

13. Apparatus for producing biaxially oriented polymer sheet from polymer feedstock, the apparatus comprising:

an isochoric procession region comprising a first pair of opposed belts, each trained around a pair of rollers and each having inner and outer surfaces;

a first pair of platens disposed adjacent the inside surfaces of the belts and oriented in converging opposed relation; the first pair of platens having a plurality of closely spaced rollers thereon directly engaging the inside surfaces of the belts to urge the belts into engagement with the polymer feedstock so as to substantially eliminate rebound of the polymer stock so as to substantially eliminate rebound of the polymer feedstock; said first pair of platens having second sections wherein the belts run parallel to one another; at least in the second sections of the first pair of platens having heat supplied thereto in order to anneal the sheet produced by the isochoric deformation of the polymer feedstock;

an isobaric section positioned just downstream of the isochoric section, wherein the isobaric section comprises a second pair of opposed belts, each trained around a pair of rollers and extending parallel to one another;

a second pair of platens disposed within the isobaric section, the second pair of platens having surfaces extending parallel to one another and oil seals disposed at the interfaces between the second pair of platens and inner surfaces of the belts for both lubricating the interfaces and for providing heat transfer from the second pair of belts to the second pair of platens; and means for cooling the second pair of platens so that the second pair of platens, in cooperation with the second pair of opposed belts in the isobaric region, restrain the sheet while cooling the sheet, whereby the sheet remains flat and stable upon emerging from the apparatus.

14. The apparatus of claim 13, further including means for inserting a strip of material between at least one of the belts in the isobaric section and the sheet at a location just downstream of the isochoric section and just upstream of the isobaric section.

15. The apparatus of claim 14, further including means for inserting an additional strip of material between the other belt of the isobaric section and the sheet at a location just downstream of the isochoric section and just upstream of the isobaric section so as to modify the opposite surface of the sheet in accordance with the configuration of the inserted strip of material.

16. The apparatus in accordance with claim 13, wherein the rollers disposed between the first pair of platens and first pair of belts and are arranged in an alternating array so as to maximize the number of contact areas with the inner surfaces of the belts engaged by the rollers and thereby enhance heat transfer from the platens while minimizing rebound of the polymer product as the polymer feedstock is spread and reduced in thickness.

* * * * *

UNITED STATES PATENT AND TRADEMARK OFFICE
CERTIFICATE OF CORRECTION

PATENT NO. : 4,956,140
DATED : September 11, 1990
INVENTOR(S) : Rolles et al

It is certified that error appears in the above-identified patent and that said Letters Patent is hereby corrected as shown below:

Column 1, Line 10:

Reads: "24, 1986, which is a continuation-in-part application of"

Should Read: --24, 1986, now U.S. Patent No. 4,874,657 which is a continuation-in-part application of--

Column 1, Line 12:

Reads: "9, 1985. This application is also related to PCT applica-"

Should Read: --9, 1985, now U.S. Patent No. 4,789,514. This application is also related to PCT applica- --

Column 7, Line 27:

Reads: "in the Z direction backflow against the belt surfaces (see"

Should Read: --backflow in the Z direction against the belt surfaces (see--

Column 12, Line 40:

Reads: "a=Width angle in the deformation zone;"

Should Read: --a=Wedge angle in the deformation zone;--

UNITED STATES PATENT AND TRADEMARK OFFICE
CERTIFICATE OF CORRECTION

PATENT NO. : 4,956,140

DATED : September 11, 1990

INVENTOR(S) : Rolles, et. al.

It is certified that error appears in the above-identified patent and that said Letters Patent is hereby corrected as shown below:

Column 13, Claim 1, Line 2
    Reads: "while withdrawing head from the material."
Should Read: --while withdrawing heat from the material.--

Column 14, Claim 13, Lines 10-12
    Reads: "so as to substantially eliminate rebound of the polymer stock so as to substantially eliminate rebound of the polymer feedstock; said first pair of platens"

Should Read: --so as to substantially eliminate rebound of the polymer feedstock; said first pair of platens--

Signed and Sealed this

First Day of September, 1992

Attest:

DOUGLAS B. COMER

Attesting Officer

Acting Commissioner of Patents and Trademarks